United States Patent
Hedayat et al.

(10) Patent No.: US 8,374,271 B2
(45) Date of Patent: Feb. 12, 2013

(54) METHOD AND SYSTEM FOR RESIZING A MIMO CHANNEL

(75) Inventors: Ahmadreza Hedayat, Allen, TX (US); Genyuan Wang, Plano, TX (US); Mohammad Janani, Plano, TX (US); Hanqing Lou, Garland, TX (US)

(73) Assignee: Cisco Technology, Inc., San Jose, CA (US)

( * ) Notice: Subject to any disclaimer, the term of this patent is extended or adjusted under 35 U.S.C. 154(b) by 1068 days.

(21) Appl. No.: 11/956,280

(22) Filed: Dec. 13, 2007

(65) Prior Publication Data

US 2008/0165882 A1 Jul. 10, 2008

Related U.S. Application Data

(60) Provisional application No. 60/879,199, filed on Jan. 8, 2007.

(51) Int. Cl.
*H04B 7/02* (2006.01)

(52) U.S. Cl. ........ 375/267; 375/260; 375/262; 375/271; 375/295; 375/299

(58) Field of Classification Search .................. 375/150, 375/219, 252, 259, 260, 262, 267, 293, 295, 375/299, 306, 316, 342, 343, 350, 359, 360
See application file for complete search history.

(56) References Cited

U.S. PATENT DOCUMENTS

| | | | | |
|---|---|---|---|---|
| 7,813,441 B2* | 10/2010 | Jalali et al. | ..................... | 375/267 |
| 7,822,140 B2* | 10/2010 | Catreux et al. | ................ | 375/267 |
| 7,929,417 B2* | 4/2011 | Jung et al. | ..................... | 370/210 |
| 8,285,226 B2* | 10/2012 | Lundby et al. | ................ | 455/101 |
| 2005/0265477 A1 | 12/2005 | Takeda et al. | | |
| 2006/0193245 A1* | 8/2006 | Aghvami et al. | ............. | 370/208 |
| 2007/0133390 A1* | 6/2007 | Luo et al. | ...................... | 370/208 |
| 2007/0183518 A1* | 8/2007 | Ma et al. | ......................... | 375/260 |
| 2010/0266060 A1* | 10/2010 | Kimura et al. | ................ | 375/267 |
| 2012/0140838 A1* | 6/2012 | Kadous et al. | ................ | 375/267 |
| 2012/0216092 A1* | 8/2012 | Lee et al. | ....................... | 714/748 |

OTHER PUBLICATIONS

International Preliminary Report on Patentability and Written Opinion dated Jul. 23, 2009; cited in PCT/US2007/087561.

* cited by examiner

*Primary Examiner* — Hirdepal Singh

(57) ABSTRACT

The present invention discloses a method for generating a signal stream in a multiple-input-multiple-output (MIMO) channel of a wireless communications system. The method comprises encoding at least one transmitting message into a first signal sequence, transforming the first signal sequence into a second and a third signal sequence by a first and a second predetermined rule, respectively, coupling the second signal sequence to a first antenna, coupling the third signal sequence to a second antenna, transmitting a signal stream comprising the first and second signal sequences to a mobile station.

18 Claims, 4 Drawing Sheets

METHOD AND SYSTEM FOR RESIZING A MIMO CHANNEL

CROSS REFERENCE

The present application claims the benefit of U.S. Provisional Application Ser. 60/879,199, which was filed on Jan. 8, 2007.

BACKGROUND

Orthogonal frequency division multiplexing (OFDM) and multiple-access orthogonal frequency division multiplexing (OFDMA) are two commonly used physical layer transmission schemes in wireless communications networks. Combining the multiple-input-multiple-output (MIMO) technique with OFDM or OFDMA greatly enhances the performance of a wireless communications network. The MIMO technique, which employs an array of antennas to transmit concurrently multiple signal streams to a mobile station (MS), improves the throughput and reliability of a wireless communications network.

The most commonly used MIMO methods are space-time coding (STC) and spatial multiplexing (SM). An STC method exploits spatial and temporal diversity to provide better reliability for a wireless communications network. By contrast, an SM method exploits spatial diversity to improve the throughput of a network. Several STC and SM methods have been developed for a network with a 2-antenna base transceiver station (BTS) employing the MIMO technique. However, there are no known STC or SM methods that can achieve the same level of performance when applied to a network with a BTS which has an antenna array of more than two antennas as in a network with a 2-antenna BTS.

A couple of issues occur when an STC or SM method is employed in a wireless communications network with a BTS which has an antenna array of more than two antennas. For example, it is necessary to reserve extra channel resources for non-overlapping, non-interfering pilot signals for each antenna in the antenna array. Since the allocation of pilot signals to every frequency must be repeated regularly, it consumes a lot of radio bandwidth and thus reduces the utilization of a wireless communications network. In addition, detecting signals transmitted from an antenna array of more than two antennas is more complicated than detecting signals from a two-antenna array, thereby making the signal acquisition process complex.

Currently, most wireless communications networks are designed in such a way that they function well when BTSs in these systems have two antennas and mobile stations (MSs) only have the ability to process MIMO signals transmitted from two antennas. When a BTS is upgraded to have more than two antennas, an MS must also be upgraded in order to benefit from receiving additional signals transmitted from additional antennas.

As such, what is desired is a system and method for creating a desired number of MIMO signal streams in a wireless communications network with a BTS that has an antenna array of more than two antennas. The desired number is less than the number of antennas in the antenna array.

SUMMARY

The present invention discloses a method for generating a signal stream in a multiple-input-multiple-output (MIMO) channel of a wireless communications system. The method comprises encoding at least one transmitting message into a first signal sequence, transforming the first signal sequence into a second and a third signal sequence by a first and a second predetermined rule, respectively, coupling the second signal sequence to a first antenna, coupling the third signal sequence to a second antenna, transmitting a signal stream comprising the first and second signal sequences to a mobile station.

The construction and method of operation of the invention, together with additional objects and advantages thereof, is best understood from the following description of specific embodiments when read in connection with the accompanying drawings.

BRIEF DESCRIPTION OF THE DRAWING

The drawings accompanying and forming part of this specification are included to depict certain aspects of the invention. The invention may be better understood by reference to one or more of these drawings in combination with the description presented herein. It should be noted that the features illustrated in the drawings are not necessarily drawn to scale

DESCRIPTION

The following detailed description of the invention refers to the accompanying drawings. The description includes exemplary embodiments, not excluding other embodiments, and changes may be made to the embodiments described herein without departing from the spirit and scope of the invention. The following detailed description does not limit the invention. Instead, the scope of the invention is defined by the appended claims.

The present invention discloses a system and method for creating two MIMO signal streams in a wireless communications network with a base transceiver station (BTS) which has an antenna array of more than two antennas. Specifically, a space-time coding (STC) or spatial multiplexing (SM) method, developed for a network with a 2-antenna BTS, is applied in such a network. Even though the exemplary embodiment describes a method creating only two MIMO signal streams, the method could be easily adapted to create more than two MIMO signal streams.

In general, the antennas on the BTS are divided into multiple groups and each group of antennas forms a logical antenna. As a result, the BTS creates multiple MIMO signal streams by using the multiple logical antennas. Using a logical antenna comprising multiple antennas provides frequency diversity, thereby improving the performance of a wireless communications network. Moreover, it is not necessary to upgrade a mobile station solely because the number of antennas on the BTS is higher than two.

Figure 1:
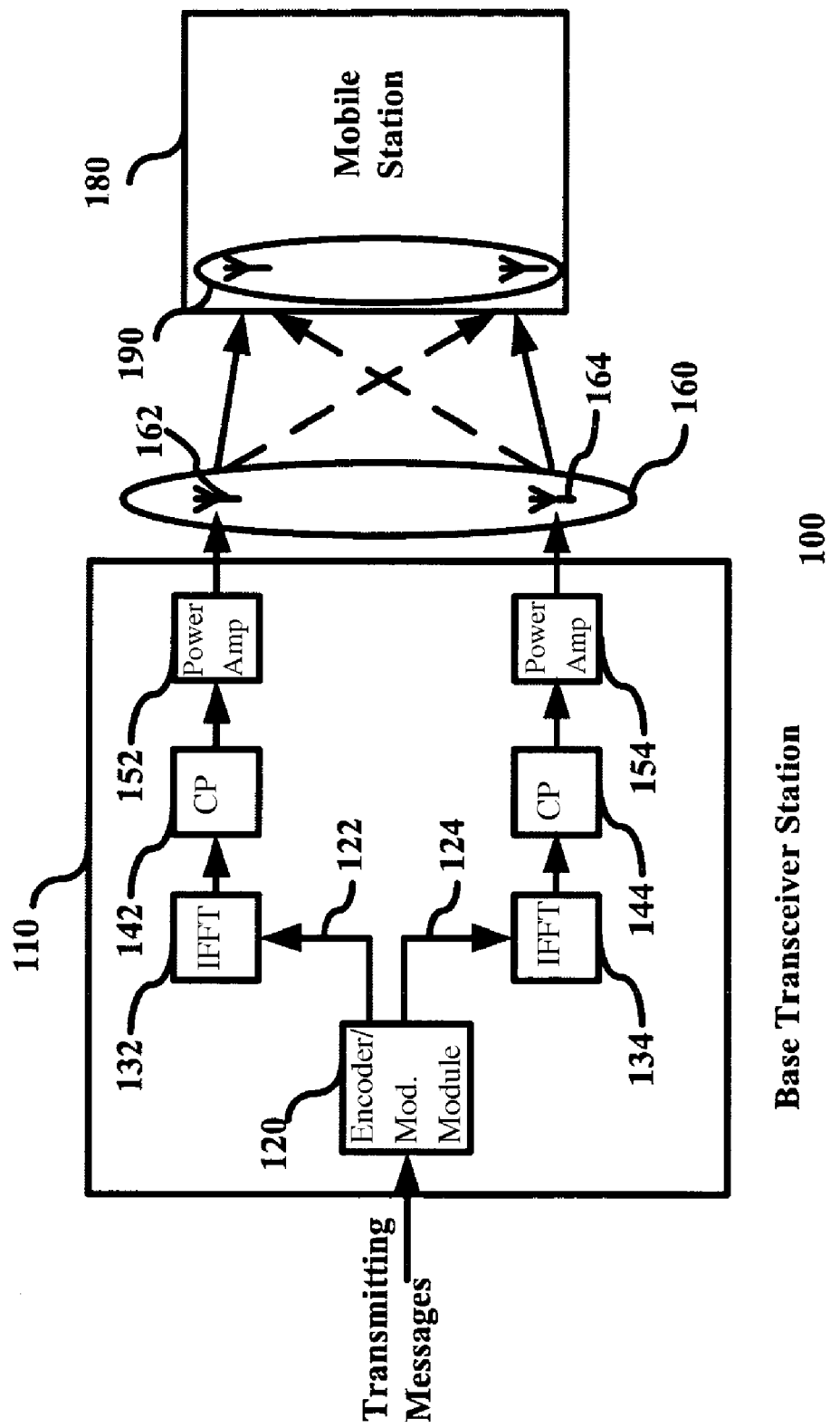
FIG. 1 is a block diagram illustrating a conventional wireless communications network.

FIG. 1 is a system diagram of a conventional wireless communications network. A conventional wireless communications network 100 employs an STC or SM method with the OFDM or OFDMA scheme. A BTS 110, equipped with an antenna array 160 of two antennas 162 and 164, creates two MIMO signal streams. The antenna(s) 190 on an MS 180 receives the two MIMO signal streams. The MS 180 could have either one or two antennas. If an STC method is employed, a single antenna will suffice, but with an additional antenna, the performance of the network is improved. However, if an SM method is employed, the number of receiving antennas on the MS 180 must be the same as that of transmitting antennas on the BTS 110.

After a transmitting message enters an encoder/modulation module 120, which performs channel coding and STC or SM coding on the transmitting message, two output signal sequences 122 and 124 are sent to inverse fast Fourier transform (IFFT) modules 132, 134. Subsequently, signal sequences 122 and 124 pass through a transmission chain and undergo further processing, which includes a cyclic prefix (CP) module, a power amplifier module, and an antenna. In FIG. 1, one transmission chain comprises a CP module 142, a power amplifier module 152, and an antenna 162, and the other comprises a CP module 144, a power amplifier module 154, and an antenna 164. Two MIMO signal streams are transmitted via antennas 162 and 164.

Figure 2:
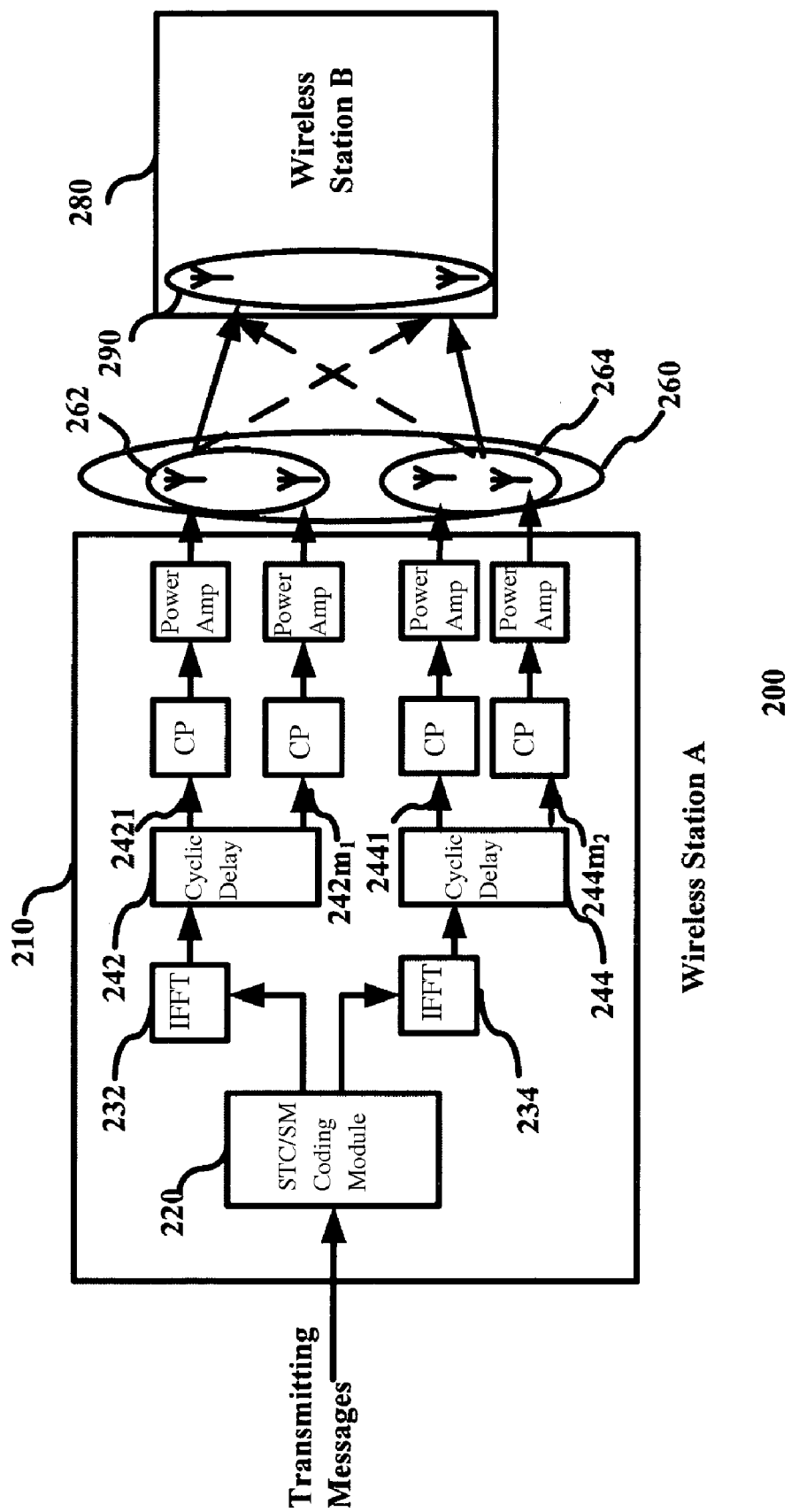
FIG. 2 is a block diagram illustrating a wireless communications network in accordance with the present invention.

FIG. 2 is a block diagram illustrating a wireless communications network 200 in accordance with the present invention. For a BTS with n antennas, there are n transmission chains, each of which includes a CP module, a power amplifier module, and an antenna. The n transmission chains are divided into multiple transmission groups each having a cyclic delay module. As an example, the n transmission chains of the network 200 are divided into two groups: transmission group 1 with $m_1$ transmission chains and transmission group 2 with $m_2$ transmission chains, where $m_1+m_2=n$.

Referring back to FIG. 2, the wireless communications network 200 comprises a first wireless station 210, which includes a channel encoding/modulation and a STC or SM coding module 220, inverse fast Fourier transform (IFFT) modules 232 and 234, and cyclic delay modules 242 and 244. The wireless communications network 200 employs an STC or SM method in conjunction with the OFDM or OFDMA scheme. The first wireless station 210 is equipped with an antenna array 260 of n antennas, where n is an integer greater than two.

The cyclic delay module 242 has one input signal sequence and $m_1$ output signal sequences. Similarly, the cyclic delay module 244 has one input signal sequence and $m_2$ output signal sequences. The $m_1$ output signal sequences are fed to the $m_1$ transmission chains in transmission group 1 while the $m_2$ output signal sequences are fed to the $m_2$ transmission chains in transmission group 2.

Each of the output signal sequences 242$[1:m_1]$ and 244$[1:m_2]$ of the cyclic delay modules 242 and 244 is delayed by a predetermined cyclic delay factor $\delta$ (or $\theta$) before it is sent to the corresponding CP module. Specifically, the cyclic delay modules 242 and 244 convert each of the elements in each of the signal sequences 242$[1:m_1]$ and 244$[1:m_2]$ from $(x_1 x_2 \ldots x_{N-1} x_N)$ to $(x_{1-\delta+N} x_{2-\delta+N} \ldots x_1 x_2 \ldots x_{N-1-\delta} x_{N-\delta})$ by shifting the elements in each signal sequence by $\delta_j$, where $\delta_j$ is an cyclic delay factor for input chain j and $0<\delta_j<N$. More specifically, the shifting operation is completed by replacing an element $x_i$ in each signal sequence with $x_{mod(i-\delta,N)}$, where y is the modulo of i, with respect to N; y=mod(i,N); and I=kN+y for any integer k.

The antennas in transmission group 1 transmit the $m_1$ signal sequences to a second wireless station, which then detects and receives a signal stream comprising $m_1$ signal sequences. Each of the $m_1$ signal sequences in the received signal stream is time-shifted by a predetermined amount, relative to each other, thereby creating frequency diversity in the received combined signal stream. The $m_2$ signal sequences go through the same process.

Figure 3:
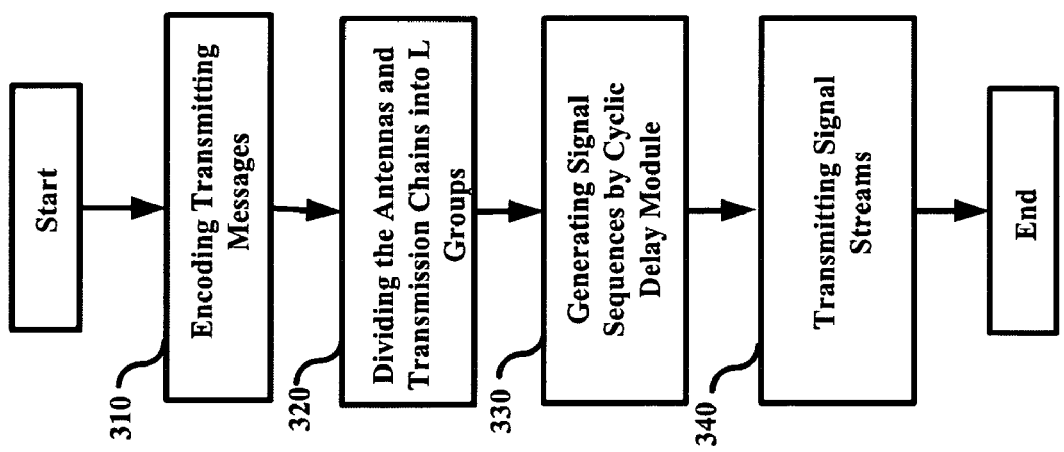
FIG. 3 is a flow diagram illustrating a method for creating multiple signal streams comprising a plurality of signal sequences in accordance with the present invention.

FIG. 3 is a flow diagram illustrating a method for creating multiple signal streams comprising a plurality of signal sequences in accordance with the present invention. In step 310, after a transmitting message is fed into a channel encoding/modulation module and an STC encoder, the encoded signal sequences are sent to corresponding IFFT modules.

In step 320, the n transmission chains are divided into L transmission groups in accordance with a predetermined rule. In one embodiment of the present invention, L equals two. Transmission group 1 with $m_1$ transmission chains acts as a logical transmission chain, so does transmission group 2 with $m_2$ transmission chains. As a result, the array of the n antennas $(m_1+m_2=n)$ on a first wireless station functions as an array of two logical antennas. In step 330, the signal sequences from the IFFT modules are fed into corresponding cyclic delay modules associated with each transmission group. The output of the cyclic delay module associated with transmission group 1 comprises $m_1$ signal sequences, which are subsequently sent to each of the $m_1$ corresponding transmission chains. Cyclic delay operation is performed on each of the $m_1$ signal sequences by shifting each of the elements in each of the $m_1$ signal sequences by a corresponding cyclic delay factor $\delta$, which is determined in accordance with a predetermined algorithm. The process is identical for the output of the cyclic delay module associated with transmission group 2.

The predetermined rule for cyclic delay factors comprises the channel condition of a wireless communications network and that of an individual mobile station. The $m_1$ signal sequences, each of which has been delayed by a predetermined cyclic delay factor before adding CPs and being transmitted, form a signal stream, and so do the $m_2$ signal sequences. Consequently, the frequency diversity of the receiving signals is increased. A second wireless station need not know about the values of the delay factors associated with the $m_1$ and $m_2$ signal sequences transmitted by transmission groups 1 and 2. As a result, the performance of a wireless communications network is improved. In step 340, the $m_1$ and $m_2$ signal sequences are transmitted to the second wireless station. The $m_1$ signal sequences are received as a combined signal stream, and so are the $m_2$ signal sequences.

Figure 4:
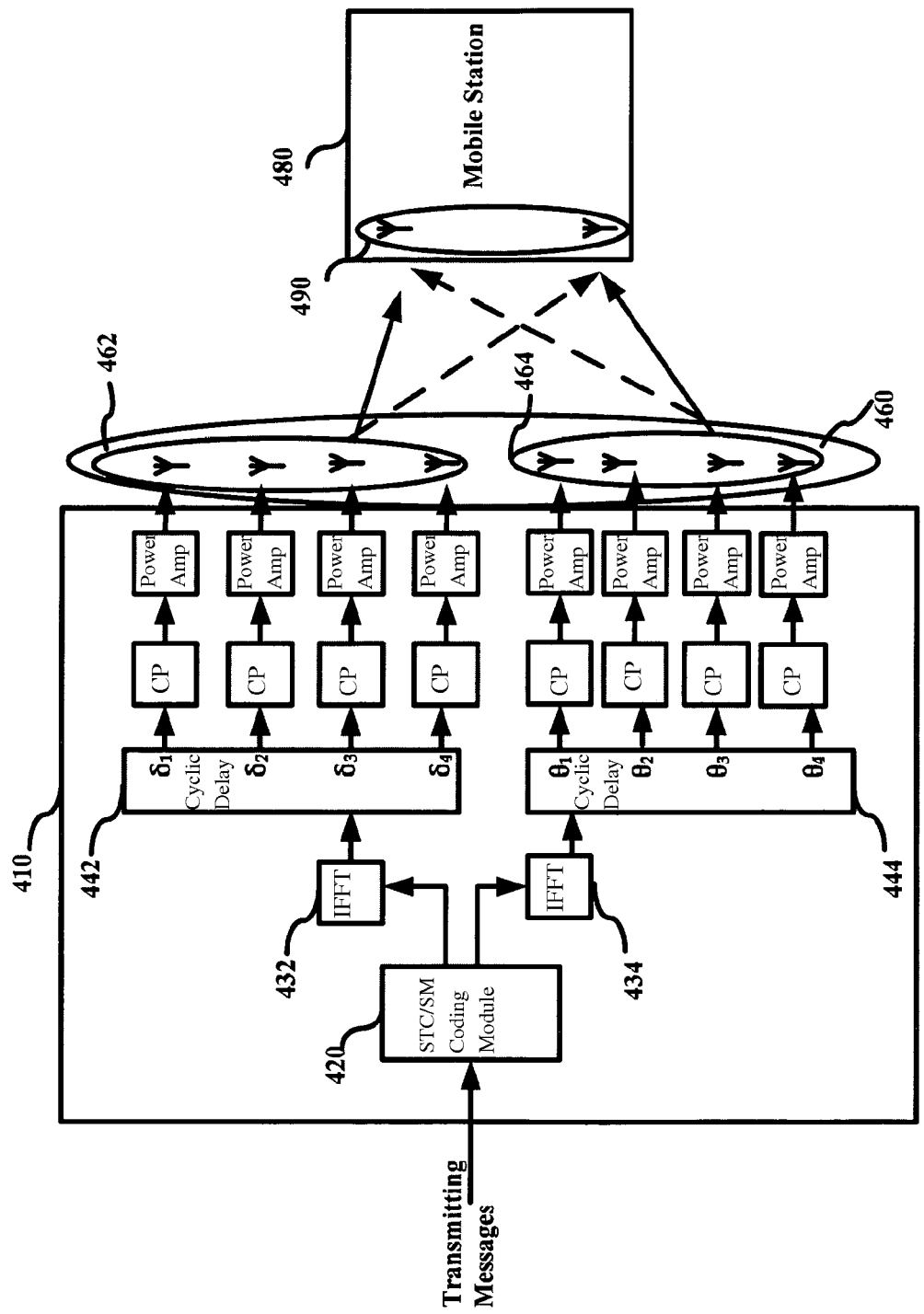
FIG. 4 shows an exemplary network with an eight-antenna array on a BTS in accordance with the present method.

FIG. 4 is an exemplary network with an eight-antenna array on a BTS in accordance with the present method. A wireless communications network 400 has a BTS 410, which has an antenna array 460 of eight antennas. The eight transmission chains with the associated antennas are divided into two transmission groups, with each having four transmission chains. Each of the cyclic delay modules 442 and 444 generate four signal sequences. The time delay of the four signal sequences in transmission group 1 are $\delta_1$, $\delta_2$, $\delta_3$ and $\delta_4$, and those of the four signal sequences in transmission group 2 are $\theta_1$, $\theta_2$, $\theta_3$, and $\theta_4$. In one variation of the aforementioned embodiment $\delta_1=\delta_2=0$, $\delta_3=\delta_4=\delta$, $\theta_1=\theta_2=0$, and $\theta_3=\theta_4=\theta$.

A cyclic delay of $\delta$ (or $\theta$) is performed on the input chain of the antennas. The cyclic delay operation, with an integer amount $0<\delta<N$, converts the sequence $(x_1 x_2 \ldots x_{N-1} x_N)$ to $(x_{1-\delta+N} x_{2-\delta+N} \ldots x_1 x_2 \ldots x_{N-1-\delta} x_{N-\delta})$ i.e. $x_i$ is replaced with $x_{mod(1-\delta,N)}$, where y =mod(i,N) is the modulo of I with respect to N, i.e., I=kN=y, for any integer k. The main advantage of introducing cyclic delay of $\delta$ and $\theta$ for some of the antennas is that virtual channels associated with the antenna have more frequency selectivity. This would translate to better link performance.

The above illustration provides many different embodiments for implementing different features of the invention.

Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method comprising:
   at a first wireless station, encoding a message to be transmitted between the first wireless station and a second wireless station into a first signal sequence using at least one of a space-time coding and spatial multiplexing technique;
   producing a second signal sequence and a third signal sequence from the first signal sequence;
   performing a first signal transformation on the second signal sequence and a second signal transformation on the third signal sequence;
   performing a first cyclic delay by a first predetermined cyclic delay factor on a first output data of the first signal transformation to increase frequency selectivity of the first output data;
   performing a second cyclic delay by a second predetermined cyclic delay factor on a second output data of the second signal transformation to increase frequency selectivity of the second output data, wherein the second predetermined cyclical delay factor is different from the first predetermined cyclic delay factor;
   allocating the first output data of the first signal transformation into a first plurality of transmission chains of a first transmission group at the first wireless station, wherein each of the first transmission chains of the first transmission group is configured to transmit the first output data of the first signal transformation via one of a first plurality of antennas of the first transmission group; and
   allocating the second output data of the second signal transformation into a second plurality of transmission chains of a second transmission group at the first wireless station, wherein each of the second transmission chains of the second transmission group is configured to transmit the second output data of the second signal transformation via one of a second plurality of antennas of the second transmission group.

2. The method of claim 1, wherein performing the first cyclic delay and performing the second cyclic delay comprises delaying the first output data of the first signal transformation and delaying the second output of the second signal transformation based on a channel condition of the wireless communications network and that of an individual mobile station.

3. The method of claim 1, further comprising:
   supplying the first output data of the first signal transformation to one or more of the first plurality of transmission chains for transmission via corresponding ones of the first plurality of antennas;
   supplying the second output data of the second signal transformation to one or more of the second plurality of transmission chains for transmission via corresponding ones of the second plurality of antennas; and
   transmitting the first output data of the first signal transformation and the second output data of the second signal transformation via the first and second pluralities of antennas to the second wireless station.

4. The method of claim 1, wherein performing the first signal transformation comprises performing an Inverse Fast Fourier Transform (IFFT) on the second signal sequence and wherein performing the second signal transformation comprises performing the IFFT on the third signal sequence.

5. The method of claim 1, wherein performing the first cyclic delay by delaying the first output data of the first signal transformation comprises replacing elements of the second signal sequence with elements derived from the first predetermined cyclical delay factor and wherein performing the second cyclic delay by delaying the second output data of the second signal transformation comprises replacing elements of the third signal sequence with elements derived from the second predetermined cyclical delay factor.

6. The method of claim 3, wherein supplying the first output data comprises supplying the first output data to the first plurality of transmission chains for transmission via a first virtual antenna comprising the first plurality of antennas and wherein supplying the second output data comprises supplying the second output data to the second plurality of transmission chains for transmission via a second virtual antenna comprising the second plurality of antennas.

7. A method comprising:
   at a first wireless station, encoding a message to be transmitted between the first wireless station and a second wireless station into a first signal sequence using at least one of a space-time coding and spatial multiplexing technique;
   producing a second signal sequence and a third signal sequence from the first signal sequence;
   performing a first signal transformation on the second signal sequence and a second signal transformation on the third signal sequence;
   performing a first cyclic delay on a first output data of the first signal transformation to increase frequency selectivity of the first output data;
   performing a second cyclic delay on a second output data of the second signal transformation to increase frequency selectivity of the second output data;
   allocating the first output data of the first signal transformation into a first plurality of transmission chains of a first transmission group at the first wireless station, wherein each of the first transmission chains of the first transmission group is configured to transmit the first output data of the first signal transformation via one of a first plurality of antennas of the first transmission group; and
   allocating the second output data of the second signal transformation into a second plurality of transmission chains of a second transmission group at the first wireless station, wherein each of the second transmission chains of the second transmission group is configured to transmit the second output data of the second signal transformation via one of a second plurality of antennas of the second transmission group;
   wherein performing the first cyclic delay comprises delaying the first output data by shifting every element in the second signal sequence by a first predetermined amount and wherein performing the second cyclic delay comprises delaying the second output data by shifting every element in the third signal sequence by a second predetermined amount, the second predetermined amount being different from the first predetermined amount.

8. The method of claim 7, wherein the first predetermined amount is an integer.

9. The method of claim 7, wherein the second predetermined amount is an integer.

10. An apparatus comprising:
an encoder configured to:
encode a message to be transmitted to a wireless station into a first signal sequence using at least one of a space-time coding and spatial multiplexing technique; and
produce a second signal sequence and a third signal sequence from the first signal sequence;
a first signal transformation module configured to perform a first signal transformation on the second signal sequence;
a first cyclic delay module configured to perform a first cyclic delay by a first predetermined cyclical delay factor on a first output data of the first signal transformation to increase frequency selectivity of the first output data;
a second signal transformation module configured to perform a second signal transformation on the third signal sequence;
a second cyclic delay module configured to perform a second cyclic delay by a second predetermined cyclical delay factor on a second output data of the second signal transformation to increase frequency selectivity of the second output data, wherein the second predetermined cyclical delay factor is different from the first predetermined cyclic delay factor;
a first plurality of antennas;
a first plurality of transmission chains of a first transmission group, the first plurality of transmission chains configured to transmit the first output data of the first signal transformation via the first plurality of antennas;
a second plurality of antennas; and
a second plurality of transmission chains of a second transmission group, the second plurality of transmission chains configured to transmit the second output data of the second signal transformation via the second plurality of antennas.

11. The apparatus of claim 10, wherein the first cyclic delay module and second cyclic delay module are configured to delay the first output data of the first signal transformation and the second output data of the second signal transformation based on a channel condition of a wireless communications network and that of an individual mobile station.

12. The apparatus of claim 10, wherein the first cyclic delay module is configured to supply the first output data of the first signal transformation to one or more of the first plurality of transmission chains for transmission via corresponding ones of the first plurality of antennas, and wherein the second cyclic delay module is configured to supply the second output data of the second signal transformation to one or more of the second plurality of transmission chains for transmission via corresponding ones of the second plurality of antennas.

13. The apparatus of claim 10, wherein the first signal transformation module is configured to perform the first signal transformation by performing an Inverse Fast Fourier Transform (IFFT) on the second signal sequence and wherein the second signal transformation module is configured to perform the second signal transformation by performing the IFFT on the third signal sequence.

14. The apparatus of claim 10, wherein the first cyclic delay module is configured to delay the first output data of the first signal transformation by replacing elements of the second signal sequence with elements derived from the first predetermined cyclical delay factor, and the second cyclic delay module is configured to delay the second output data of the second signal transformation by replacing elements of the third signal sequence with elements derived from the second predetermined cyclical delay factor.

15. The apparatus of claim 12, wherein the first cyclic delay module is configured to supply the first output data to the first plurality of transmission chains for transmission via a first virtual antenna comprising the first plurality of antennas and wherein the second cyclic delay module is configured to supply the second output data to the second plurality of transmission chains for transmission via a second virtual antenna comprising the second plurality of antennas.

16. An apparatus comprising:
an encoder configured to:
encode a message to be transmitted to a wireless station into a first signal sequence using at least one of a space-time coding and spatial multiplexing technique; and
produce a second signal sequence and a third signal sequence from the first signal sequence;
a first signal transformation module configured to perform a first signal transformation on the second signal sequence;
a first cyclic delay module configured to perform a first cyclic delay on a first output data of the first signal transformation to increase frequency selectivity of the first output data;
a second signal transformation module configured to perform a second signal transformation on the third signal sequence;
a second cyclic delay module configured to perform a second cyclic delay on a second output data of the second signal transformation to increase frequency selectivity of the second output data;
a first plurality of antennas;
a first plurality of transmission chains of a first transmission group, the first plurality of transmission chains configured to transmit the first output data of the first signal transformation via the first plurality of antennas;
a second plurality of antennas; and
a second plurality of transmission chains of a second transmission group, the second plurality of transmission chains configured to transmit the second output data of the second signal transformation via the second plurality of antenna;
wherein the first cyclic delay module is further configured to shift every element in the second signal sequence by a first predetermined amount and wherein the second cyclic delay module is further configured to shift every element in the third signal sequence by a second predetermined amount, the second predetermined amount being different from the first predetermined amount.

17. The apparatus of claim 16, wherein the first cyclic delay module is configured to shift every element in the second sequence by the first predetermined amount comprising an integer.

18. The apparatus of claim 16, wherein the second cyclic delay module is configured to shift every element in the third sequence by the second predetermined amount comprising an integer.

* * * * *